(12) United States Patent
O'Connor et al.

(10) Patent No.: US 8,806,660 B2
(45) Date of Patent: Aug. 12, 2014

(54) SYSTEM AND METHOD FOR SECURE LICENSING FOR AN INFORMATION HANDLING SYSTEM

(75) Inventors: Clint H. O'Connor, Austin, TX (US); Gary D. Huber, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 244 days.

(21) Appl. No.: 13/042,925

(22) Filed: Mar. 8, 2011

(65) Prior Publication Data

US 2012/0233706 A1 Sep. 13, 2012

(51) Int. Cl.
H04L 29/06 (2006.01)

(52) U.S. Cl.
USPC .................................. 726/30; 713/1

(58) Field of Classification Search
CPC G06F 21/10; G06F 2221/0704; G06F 21/123
See application file for complete search history.

(56) References Cited

U.S. PATENT DOCUMENTS

| | | | |
|---|---|---|---|
| 6,865,436 B2 * | 3/2005 | O'Connor et al. | 700/117 |
| 2004/0039916 A1 * | 2/2004 | Aldis et al. | 713/177 |
| 2004/0249815 A1 * | 12/2004 | Lee | 707/9 |
| 2005/0256805 A1 * | 11/2005 | Satkunanathan et al. | 705/59 |
| 2006/0179293 A1 * | 8/2006 | O'Connor et al. | 713/1 |
| 2007/0287418 A1 * | 12/2007 | Reddy | 455/410 |
| 2008/0256349 A1 * | 10/2008 | Dennis et al. | 713/1 |
| 2009/0031414 A1 * | 1/2009 | Winter et al. | 726/15 |
| 2010/0107238 A1 * | 4/2010 | Stedman et al. | 726/13 |
| 2010/0191800 A1 * | 7/2010 | Jaber et al. | 709/203 |
| 2011/0035589 A1 * | 2/2011 | Butcher et al. | 713/168 |

OTHER PUBLICATIONS

ZTIC; "IBM Zone Trusted Information Channel (ZTIC)"; http://www.zurich.ibm.com/ztic/; pp. 2, Mar. 15, 2011.
Software Protection Dongle; Wikipedia, http://en.wikipedia.org/wiki/Dongle; pp. 5, Mar. 15, 2011.

* cited by examiner

Primary Examiner — Jason K. Gee
Assistant Examiner — Maung Lwin
(74) Attorney, Agent, or Firm — Baker Botts L.L.P.

(57) ABSTRACT

Systems and methods for reducing problems and disadvantages associated with traditional approaches to secure licensing for an information handling system are provided. In accordance with additional embodiments of the present disclosure, a method may include: (i) booting an information handling system to an operating system stored on a memory of a secure licensing device coupled to a port of the information handling system; (ii) establishing a secure wireless network connection between the secure licensing device and a licensing server; (iii) retrieving information regarding one or more hardware components of the information handling system; (iv) retrieving a license key for a software program associated with information handling system from the licensing server; (v) generating a unique marker binding the license key to the one or more hardware components; and (vi) storing the unique marker on the information handling system.

20 Claims, 2 Drawing Sheets

SYSTEM AND METHOD FOR SECURE LICENSING FOR AN INFORMATION HANDLING SYSTEM

TECHNICAL FIELD

The present disclosure relates generally to information handling systems and, more particularly, to a system and method for secure licensing in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Manufacturers of hardware and software for use on information handling systems often struggle to effectively combat software piracy. As developers create new and improved licensing schemes in an effort to defeat piracy, software pirates continue to discover mechanisms to circumvent such licensing schemes. Recent approaches to preventing piracy of software include a licensing scheme whereby a unique marker is created based on a binding of a software license key to hardware (e.g., a motherboard) making up an information handling system. Under such a scheme, the unique marker may be stored in a basic input-output system (BIOS) or other component of the information handling system, and such software may be configured to operate only if it determines that the license key for the software is associated with the stored unique marker, thus binding the license key to hardware associated with the information handling system, and preventing use of the license key with other information handling systems.

However, such a licensing scheme presents challenges in servicing, testing, or configuring information handling systems after a license key has been bound to an information handling system. For example, if any information handling system undergoes a repair that includes the replacement of a motherboard, the software installed on a hard disk drive of the information handling system with a license key bound to the replaced motherboard may not operate. As another example, in a testing environment, it may be desirable to install and uninstall different software programs (e.g., different operating systems or different versions of an operating system) so that operability of the different software programs may be verified. However, under the licensing scheme described above, such testing may require the undesired consumption of multiple license keys, which may lead to undesirable expense without a mechanism to "return" license keys. As yet another example, the above-described licensing scheme may present challenges for "late binding," in which, pursuant to a consumer request or other reason, the then-current configuration of software on an information handling system may be changed prior to shipment (e.g., when a customer orders an upgrade to standard version of software in which the license key is already bound to hardware). Such late binding may require consumption of an additional license key in the absence of a mechanism to "return" the already-bound license key.

In addition, providing service technicians, technical support staff, or factory technicians with an otherwise insecure tool for performing service, testing, and/or late binding may impair effectiveness of the licensing scheme should one or more of such individuals be untrustworthy.

SUMMARY

In accordance with the teachings of the present disclosure, the disadvantages and problems associated with secure licensing for an information handling system have been substantially reduced or eliminated.

In accordance with embodiments of the present disclosure, a device for secure licensing for an information handling system may include a processor, a network interface communicatively coupled to the processor, a plug communicatively coupled to the processor for interfacing with a port of an information handling system, and a non-transitory computer-readable medium communicatively coupled to the processor and having stored thereon one or more instructions. The one or more instructions may be configured to, when executed by the processor: (i) boot the information handling system; (ii) establish a secure wireless network connection between the network interface and a licensing server; (iii) retrieve information regarding one or more hardware components of the information handling system via the plug; (iv) retrieve a license key for a software program associated with information handling system from the licensing server; (v) generate a unique marker binding the license key to the one or more hardware components; and (vi) store the unique marker on the information handling system.

In accordance with additional embodiments of the present disclosure, a method may include: (i) booting an information handling system to an operating system stored on a memory of a secure licensing device coupled to a port of the information handling system; (ii) establishing a secure wireless network connection between the secure licensing device and a licensing server; (iii) retrieving information regarding one or more hardware components of the information handling system; (iv) retrieving a license key for a software program associated with information handling system from the licensing server; (v) generating a unique marker binding the license key to the one or more hardware components; and (vi) storing the unique marker on the information handling system.

In accordance with further embodiments of the present disclosure, non-transitory computer readable medium may have stored thereon one or more instructions. The one or more instructions may be configured to, when executed by one or more processors coupled to the computer readable medium: (i) boot an information handling system communicatively coupled to the one or more processors via an external port of the information handling system; (ii) establish a secure wireless network connection between a network interface communicatively coupled to the one or more processors and a licensing server; (iii) retrieve information regarding one or more hardware components of the information handling system; (iv) retrieve a license key for a software program associated with information handling system from the licensing server; (v) generate a unique marker binding the license key to the one or more hardware components; and (vi) store the unique marker on the information handling system.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more busses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
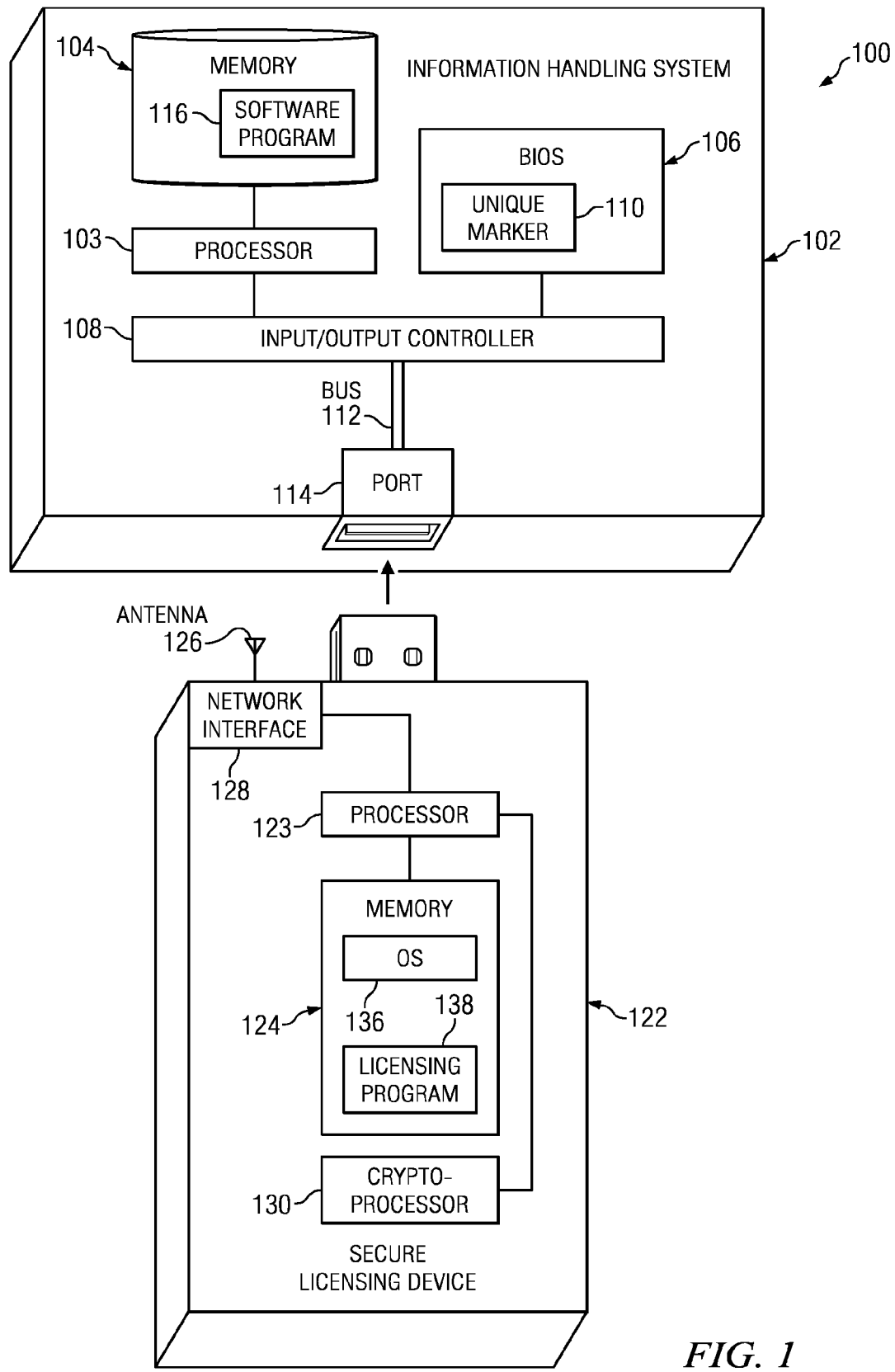
FIG. 1 illustrates a block diagram of an example system, including an information handling system and a secure licensing device, in accordance with embodiments of the present disclosure.

FIG. 1 illustrates a block diagram of an example system 100, including an information handling system 102 and a secure licensing device 122, in accordance with embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in FIG. 1, information handling system 102 may include a processor 103, a memory 104 communicatively coupled to processor 103, a basic input/output system (BIOS) 106 communicatively coupled to processor 103, an input/output (I/O) controller 108 communicatively coupled to processor 103 and BIOS 106, and a port 114 communicatively coupled to I/O controller 108 via a bus 112. These components of information handling system 102 and/or other components may be mounted to a motherboard, a printed circuit board, or other suitable device that provides connectivity among such components.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by memory 104 and/or another component of information handling system 102.

Memory 104 may be communicatively coupled to processor 103 and may comprise any system, device, or apparatus configured to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to information handling system 102 is withdrawn.

BIOS 106 may be communicatively coupled to processor 103 and may comprise any system, device, or apparatus configured to store instructions to be executed by processor 103 when information handling system 102 is booted and/or powered on. In some embodiments, BIOS 106 may be boot firmware and may be configured to be the first code executed by processor 103 when information handling system 102 is booted and/or powered on. The initial function of BIOS 106 may be to identify, test, and initialize components of information handling system 102 (e.g., video display cards, storage resources, and other hardware). As part of such initialization, BIOS code may be configured to set components of information handling system 102 into a known state, so one or more software programs 116 (e.g., an operating system) stored on compatible media (e.g., memory 104) can be executed by processor 103 and given control of information handling system 102.

As shown in FIG. 1, BIOS 106 may have stored therein one or more unique markers 110. A unique marker 110 may comprise any series of characters that represents the binding of a software program 116 to hardware (e.g., processor 103, a motherboard, etc.) of information handling system 102. In some embodiments, a unique marker 110 may be created during manufacture of information handling system 102 by a program of instructions configured to generate unique marker 110 based on a license key or unique identifier for software program 116 and/or one or more identifying characteristics of information handling system 102 (e.g., a service tag of information handling system, a serial number of information handling system, a unique identifier associated with processor 103, a unique identifier associated with a motherboard disposed in information handling system 102, and/or a unique identifier associated with one or more other components of information handling system 102).

I/O controller 108 may be communicatively coupled to processor 103, BIOS 106, and/or port 114 and may comprise any system, device, or apparatus configured to serve as an interface and/or hub between processor 103 and certain components of information handling system 102 (e.g., BIOS 106, port 114, and others components). In some embodiments, I/O controller 108 may include or be implemented as part of a southbridge chip set.

Port 114 may be communicatively coupled to I/O controller 108 via an associated bus 112, and may include any system, device, or apparatus configured to serve as an interface between information handling system 102 and other information handling systems or devices. Port 114 may be implemented as a specialized outlet on information handling system 102 to which a plug or cable may couple. Several conductors making up such outlet may provide paths for signal transfer between information handling system 102 and a coupled device. In some embodiments, port 114 may be configured to receive secure licensing device 122. Bus 112 may comprise any system, device, or apparatus configured to transfer data between I/O components of information handling system 102. For example, bus 112 may include a serial advanced technology attachment (SATA) bus, a Peripheral Component Interconnect (PCI)/Personal Computer Memory Card International Association bus, Universal Serial Bus (USB), a Small Computer System Interface (SCSI) bus, FireWire (IEEE 1394) bus, InfiniBand bus, or any other suitable bus.

Secure licensing device 122 may include a device in a suitable form factor to interface with port 114 of information handling system 102. As shown in FIG. 1, secure licensing device 122 may include a processor, a memory 124, a network interface 128, a cryptoprocessor 130, and an antenna 126.

Processor 123 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored and/or communicated by memory 124 and/or another component of secure licensing device 122. Processor 123 may be similar to or different from processor 103.

Memory 124 may be communicatively coupled to processor 123 and may comprise any system, device, or apparatus configured to retain program instructions or data for a period of time (e.g., computer-readable media). Memory 124 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to secure licensing device 122 is withdrawn. As shown in FIG. 1, memory 124 may have stored thereon an operating system (OS) 136 and a licensing program 138. OS 136 may include any collection of programs and data that may execute on processor 123 and act as an intermediary between application programs components of information handling system 102 and secure licensing device 122. In some embodiments, OS 136, while executing on processor 123, may boot information handling system 102 and thus may be able to interface with and/or control components of information handling system 102, including BIOS 106, input/output devices (keyboard, mouse, display), and/or other components of information handling system 102. OS 136 may include any suitable operating system, including, without limitation, Windows Preinstallation Environment (Windows PE or WinPE).

Licensing program 138 may include a program of instructions configured to, when executed by processor 123, securely bind software program 116 to one or more components of information handling system 102, generate a unique marker 110 representing the binding of software program 116 to information handling system 102, store the generated unique marker 110, and communicate the generated unique marker 110 to a licensing server, as described in greater detail below.

Cryptoprocessor 130 may be communicatively coupled to I/O controller 110 and may include any system, device, or apparatus configured to carry out cryptographic operations on data communicated via between secure licensing device 122 and information handling system 102. In some embodiments, cryptoprocessor 130 may be compliant with the Trusted Platform Module specification, a successor specification, and/or any other similar specification. In some embodiments, cryptoprocessor 130 may be configured to generate random numbers, generate encryption keys (e.g., RSA keys), generate and maintain hash key tables of hardware and software components of an information handling system, generate and maintain configuration parameters associated with hardware and software components of an information handling system, wrap (e.g., encrypt) keys, unwrap (e.g., decrypt) keys and/or store keys (e.g., endorsement key, storage root key, attestation identity keys, storage keys). In operation, cryptoprocessor 130 may prevent access by unauthorized persons to licensing program 138 and/or details regarding its operation. For example, licensing program 138 may be encrypted in memory 124 and may be decrypted by cryptoprocessor 130 and executed at runtime.

Network interface 128 may be communicatively coupled to processor 123 and include any suitable system, apparatus, or device operable to serve as an interface between secure licensing device 122 and a wireless network. Network interface 128 may enable secure licensing device 122 to communicate over a network using any suitable wireless transmission protocol and/or standard, including without limitation a wireless cellular standard (2G, 3G, 4G) and Wireless Fidelity (WiFi). Network interface 128 and its various components may be implemented using hardware, software, or any combination thereof. In some embodiments, network interface 128 may include to permit conversion of data (e.g., analog to digital, and vice versa), modulation and demodulation of signals, or other functions to permit wireless communication of information via a wireless network.

Antenna 126 may be coupled to network interface 128 and may include any transducer that wirelessly transmits or receives electromagnetic waves. Antenna 126 may transmit and receive information in accordance with any suitable wireless communication standard, including, without limitation, a wireless cellular standard (e.g., 2G, 3G, 4G), Wireless Fidelity (WiFi), or other suitable wireless communication standard. In operation of secure licensing device 122, antenna 126 may provide an interface for communication between secure licensing device 122 and a licensing server.

Figure 2:
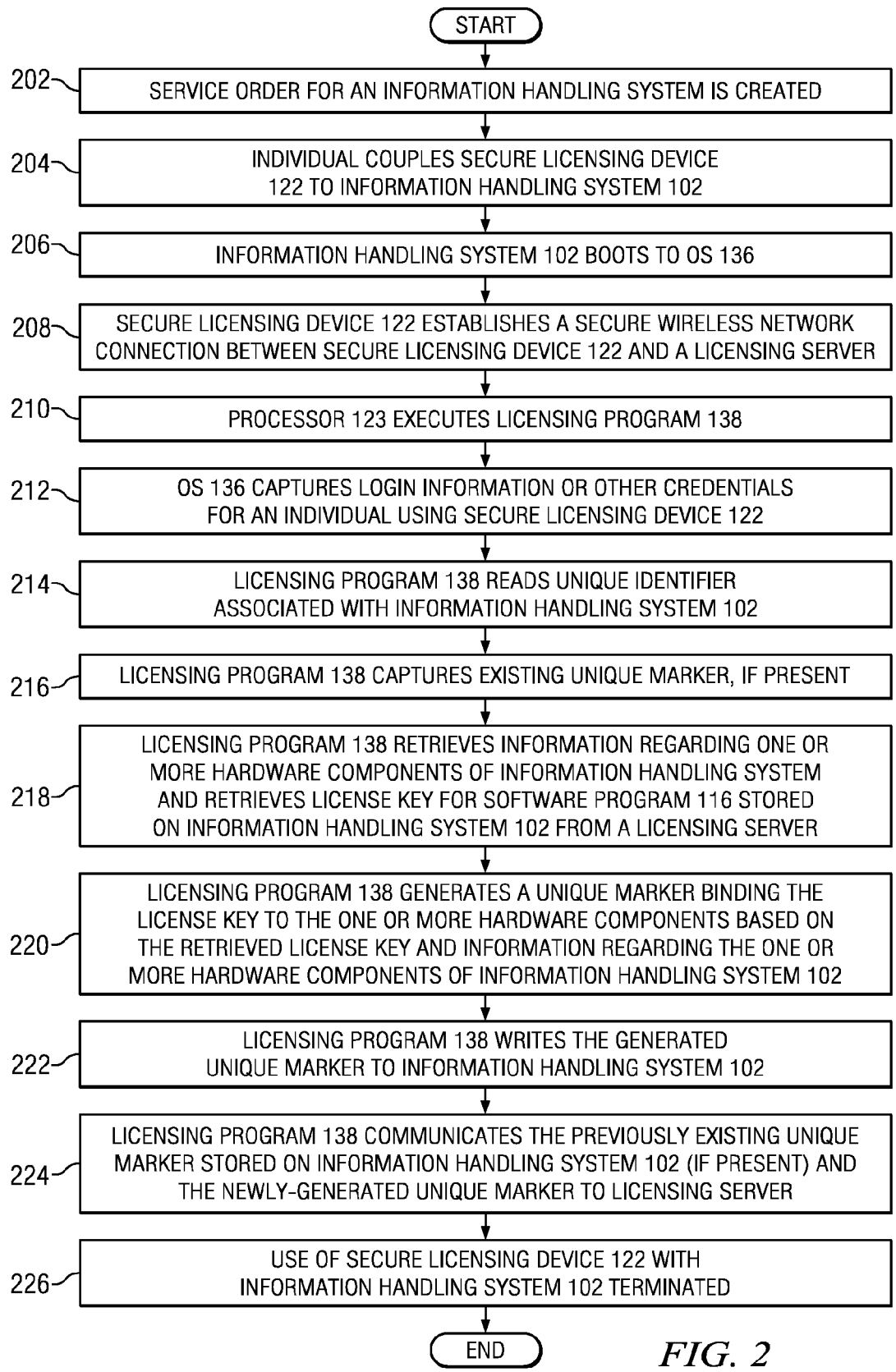
FIG. 2 illustrates a block diagram of an example method for secure licensing for an information handling system, in accordance with embodiments of the present disclosure.

FIG. 2 illustrates a flow chart of a method 200 for secure licensing for an information handling system (e.g., information handling system 102), in accordance with an embodiment of the present disclosure. According to one embodiment, method 200 preferably begins at step 202. As noted above, teachings of the present disclosure may be implemented in a variety of configurations of system 100. As such, the preferred initialization point for method 200 and the order of the steps 202-226 comprising method 200 may depend on the implementation chosen.

At step 202, a service order for an information handling system (e.g., information handling system 102) may be created. Such service order may be in regards to a repair, testing, or configuration change (e.g., late binding) of information handling system 102. In connection with creation of the service order, information regarding the service order may be stored on a licensing server (e.g., maintained by a manufacturer of information handling system 102 and/or a developer of a software program 116 stored or to be stored on information handling system 102). Such information may include identifying information regarding information handling system 102 subject to the service order (e.g., service tag, serial number, etc.), information regarding a software program 116 stored or to be stored on information handling system 102 (e.g., license key, version, etc.), nature of service order (e.g., type of repair, type of test, etc.).

At step 204, an individual (e.g., a service technician, manufacturing technician, or other suitable individual) may couple secure licensing device 122 to information handling system 102 (e.g., by inserting a plug of secure licensing device 122 into port 114).

At step 206, information handling system 102 may boot to OS 136 stored on secure licensing device 122. For example, an individual may power on information handling system 102 and information handling system 102 may boot to OS 136 automatically or in response to input from the individual. OS 136 may execute on processor 103 of information handling system 102 and/or processor 123.

In some embodiments, an individual may make a repair or modification to information handling system prior to either of step 204 or step 206 (e.g., replacement of a motherboard or other hardware).

At step 208, secure licensing device 122 may establish a secure wireless network connection between secure licensing device 122 and a licensing server via network interface 128. In some embodiments, such wireless network connection may be established by a driver (e.g., stored as part of OS 136 or a standalone program and executing on processor 123). In these and other embodiments, the wireless connection may include a Secure Socket Layer (SSL) or other secure connection.

At step 210, processor 123 may begin executing licensing program 138.

At step 212, OS 136 may capture login information or other credentials for an individual using secure licensing device 122 (e.g., a username and password for service technician, manufacturing technician, or other suitable individual).

At step 214, licensing program 138 may read via port 114 a unique identifier (e.g., serial number, service tag, etc.) associated with information handling system 102 and determine a service order (if any) for information handling system 102 (e.g., by comparing the unique identifier with information regarding service orders stored at a licensing server in wireless communication with secure licensing device 122). Alternatively or in addition, licensing program 138 may determine a service order (if any) for information handling system 102 based on credentials entered at step 212 (e.g., in connection with service orders in which a service technician replaces a motherboard or other components that may modify a unique identifier associated with information handling system 102).

At step 216, licensing program 138 may capture via port 114 an existing unique marker (if present) associated with a software program 116 stored in BIOS 106 or elsewhere in information handling system 102.

At step 218, licensing program 138 may retrieve information regarding one or more hardware components of information handling system 102 (which, may in some embodiments include information uniquely identifying the one or more hardware components such as serial numbers, for example) and retrieve a license key for a software program 116 stored on a memory 104 associated with information handling system 102 from a licensing server in wireless communication with secure licensing device 122. Such license key could be created at the time the service order is created, or could be created on demand in response to a request from licensing program 138.

At step 220, licensing program 138 may, based on the retrieved license key and information regarding the one or more hardware components of information handling system 102, generate a unique marker binding the license key to the one or more hardware components. The unique marker may be generated in any suitable manner. For example, licensing program may create the unique marker by summing or concatenating the retrieved license key, information regarding the one or more hardware components, and/or any other information (e.g., date and time). In certain embodiments, the unique marker may also be signed (e.g., by cryptoprocessor 130).

At step 222, licensing program 138 may write the generated unique marker to information handling system 102 (e.g., in BIOS 106). This unique marker may physically replace a previous marker for software program 116, or may be stored in addition to and superseding a previous marker for software program 116. As a result of the presence of the unique marker binding software program 116 to hardware of information handling system 102, software program 116 may be prevented from execution on any information handling system other than information handling system 102.

At step 224, licensing program 138 may communicate the previously existing unique marker stored on information handling system 102 (if present) and the newly-generated unique marker to a licensing server in wireless communication with secure licensing device 122.

At step 226, an individual using secure licensing device 122 in connection with information handling system 102 may log out, secure licensing device 122 may terminate its wireless connection to a licensing server, and information handling system 102 may shut down. After completion of step 226, method 200 may end.

Although FIG. 2 discloses a particular number of steps to be taken with respect to method 200, it is understood that method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software embodied in computer-readable media.

In some embodiments, secure licensing device 122 may be configured for operation in the absence of an available wireless connection to a licensing server. For example, in some embodiments secure licensing device 122 may include on its memory 124 one or more license keys associated with software programs 116 for which a licensing scheme of binding license keys to information handling system hardware may be employed. In addition, a marker retrieved from an information handling system and/or created for an information handling system in the absence of a wireless connection may be communicated at a later time in which secure licensing device 122 is able to again establish a wireless connection.

Advantageously, the systems and method described above provide a mechanism for reducing piracy via a licensing scheme that binds software license keys to information handling system hardware. In addition, a mechanism is provided whereby a secure licensing device handled by an untrusted individual may be used to facilitate the licensing scheme for service, testing, and reconfiguration. Such an individual may have no ability to consume license keys, modify digital markers, or modify other information (e.g., service tags) except as entitled and controlled by a licensing server via a secure wireless connection. In addition, a lost secure licensing device may be useless to any individual who may acquire the secure licensing device because an individual must not only provide valid login credentials for the secure licensing device, but also a matching entitlement for binding a license key to a marker must exist on a secure license server for the secure licensing device to bind and license a software program.

Although the disclosed embodiments have been described in detail, it should be understood that various changes, substitutions and alterations can be made to the embodiments without departing from their spirit and scope.

What is claimed is:

1. A device for secure licensing for an information handling system, comprising:
    a processor;
    a network interface communicatively coupled to the processor;
    a plug communicatively coupled to the processor for interfacing with a port of an information handling system;
    a non-transitory computer-readable medium communicatively coupled to the processor and having stored thereon one or more instructions, the one or more instructions configured to, when executed by the processor:
        boot the information handling system;
        establish a secure wireless network connection between the network interface and a licensing server;
        retrieve information regarding one or more hardware components of the information handling system via the plug;
        retrieve a first unique marker binding a first license key to the one or more hardware components of the information handling system via the plug;
        retrieve a second license key for a software program associated with information handling system from the licensing server;
        generate a second unique marker binding the second license key to the one or more hardware components, the second unique marker based at least on a unique hardware identifier and the second license key;
        store the unique marker on the information handling system; and
        transmit the first unique marker to the licensing server to prevent further consumption of the first license key.

2. A device according to claim 1, the plug configured to couple the device to a Universal Serial Bus (USB) port of the information handling system.

3. A device according to claim 1, wherein storing the unique marker on the information handling system comprises storing the unique marker in a BIOS of the information handling system.

4. A device according to claim 1, wherein as a result of the presence of the unique marker stored on the information handling system, the software program may be prevented from execution on an additional information handling system.

5. A device according to claim 1, the program of instructions further configured to, when executed, retrieve a second unique marker previously stored on the information handling system.

6. A device according to claim 5, the program of instructions further configured to, when executed, communicate the unique marker and the second unique marker to the licensing server via the network interface.

7. A device according to claim 1, wherein the one or more instructions are further configured to, when executed, cryptographically sign the unique identifier.

8. A method comprising:
    booting an information handling system to an operating system stored on a memory of a secure licensing device coupled to a port of the information handling system;
    establishing a secure wireless network connection between the secure licensing device and a licensing server;
    retrieving information regarding one or more hardware components of the information handling system;
    retrieving a first unique marker binding a first license key to the one or more hardware components of the information handling system via the plug;
    retrieving a second license key for a software program associated with information handling system from the licensing server;
    generating a second unique marker binding the second license key to the one or more hardware components, the second unique marker based at least on a unique hardware identifier and the second license key;
    storing the second unique marker on the information handling system; and
    transmitting the first unique marker to the licensing server to prevent further consumption of the first license key.

9. A method according to claim 8, the secure licensing device comprising a Universal Serial Bus (USB) device configured to couple to a USB port of the information handling system.

10. A method according to claim 8, wherein storing the unique marker on the information handling system comprises storing the unique marker in a BIOS of the information handling system.

11. A method according to claim 8, wherein as a result of the presence of the unique marker stored on the information handling system, the software program may be prevented from execution on an additional information handling system.

12. A method according to claim 8, further comprising retrieving a second unique marker previously stored on the information handling system.

13. A method according to claim 12, further comprising communicating the unique marker and the second unique marker to the licensing server.

14. A method according to claim 8, further comprising cryptographically signing the unique identifier.

15. A non-transitory computer readable medium having stored thereon one or more instructions, the one or more instructions configured to, when executed by one or more processors coupled to the computer readable medium:
    boot an information handling system communicatively coupled to the one or more processors via an external port of the information handling system;
    establish a secure wireless network connection between a network interface communicatively coupled to the one or more processors and a licensing server;

retrieve information regarding one or more hardware components of the information handling system;
retrieve a first unique marker binding a first license key to the one or more hardware components of the information handling system via the plug;
retrieve a second license key for a software program associated with the information handling system from the licensing server;
generate a second unique marker binding the second license key to the one or more hardware components, the second unique marker based at least on a unique hardware identifier and the second license key;
store the second unique marker on the information handling system; and
transmit the first unique marker to the licensing server to prevent further consumption of the first license key.

16. A computer-readable medium according to claim 15, wherein storing the unique marker on the information handling system comprises storing the unique marker in a BIOS of the information handling system.

17. A computer-readable medium according to claim 15, wherein as a result of the presence of the unique marker stored on the information handling system, the software program may be prevented from execution on an additional information handling system.

18. A computer-readable medium according to claim 15, further comprising the one or more instructions configured to, when executed, retrieve a second unique marker previously stored on the information handling system.

19. A computer-readable medium according to claim 18, further comprising the one or more instructions configured to, when executed, communicate the unique marker and the second unique marker to the licensing server via the network interface.

20. A computer-readable medium according to claim 15, wherein the one or more instructions are further configured to, when executed, cryptographically sign the unique marker.

* * * * *